(12) United States Patent
Hashizume

(10) Patent No.: US 7,349,128 B2
(45) Date of Patent: Mar. 25, 2008

(54) IMAGE SCANNER AND PEAK DETECTING PROCESSING METHOD OF IMAGE SCANNER

(75) Inventor: Yusuke Hashizume, Chiba-ken (JP)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 977 days.

(21) Appl. No.: 10/370,732

(22) Filed: Feb. 24, 2003

(65) Prior Publication Data

US 2004/0165234 A1  Aug. 26, 2004

(51) Int. Cl.
*H04N 1/40* (2006.01)

(52) U.S. Cl. ............... 358/443; 358/514; 358/446; 358/447; 358/538; 358/540; 358/462; 251/208.1; 348/300

(58) Field of Classification Search ............... 358/443, 358/446, 447, 514, 538, 540, 462; 250/208.1; 348/300
See application file for complete search history.

(56) References Cited

U.S. PATENT DOCUMENTS 4,499,586 A * 2/1985 Cafarella et al. ........... 375/345
4,638,352 A * 1/1987 Noda et al. ................ 348/276
5,402,249 A * 3/1995 Koseki et al. ............. 358/446
6,078,684 A * 6/2000 Inoue ....................... 382/162
6,205,258 B1* 3/2001 Lin .......................... 382/274
6,633,415 B1* 10/2003 Arafune et al. ............ 358/474
6,765,703 B1* 7/2004 Watanabe .................. 358/514
6,831,761 B2* 12/2004 Cardot et al. .............. 358/505
7,046,402 B2* 5/2006 Watanabe .................. 358/514
2002/0093697 A1* 7/2002 Spears et al. .............. 385/514

FOREIGN PATENT DOCUMENTS

JP  8-251355 A  9/1996
JP  2001-238053 A  8/2001

* cited by examiner

*Primary Examiner*—Twyler Lamb
*Assistant Examiner*—Jacky X. Zheng
(74) *Attorney, Agent, or Firm*—Foley & Lardner LLP

(57) ABSTRACT

A sheet image scanner of the present invention has plural image sensors to output electric signals by detecting optical image data that are obtained by applying a light from a light source to documents, amplifiers to amplify outputs from the plural image sensors, and a peak detection processing unit to detect a peak value of sensitivity of at least one of the plural image sensors and set a gain value for each of amplifiers for the plural image sensors using the detected peak value.

7 Claims, 5 Drawing Sheets

IMAGE SCANNER AND PEAK DETECTING PROCESSING METHOD OF IMAGE SCANNER

BACKGROUND OF THE INVENTION

1. Field of the Invention

The present invention relates to an image scanner that is used for scanning documents of a digital copying machine and an input terminal of a personal computer, and a peak detecting processing method of an image scanner.

2. Description of the Related Art

As a scanner that is used in digital copying machines and/or personal computers for scanning optical image data from documents using a Charge Coupled Device (hereinafter, abbreviated as CCD) for scanning optical image data from documents, an apparatus is so far disclosed in Japanese Patent Application No. 8-251355. This scanner scans optical image data and discriminates whether the data are color images or monochromatic images at the time of pre-scanning using color CCD sensors or a monochromatic CCD sensor having a rotary color separation filter and increases a scanning speed for a monochromic image and expands a scanning region. Further, an apparatus having color CCD sensors and a monochromatic CCD sensor arranged side by side is so far disclosed in Japanese Patent Application No. 2001-238053. This apparatus simultaneously scans image data by color CCD sensors and a monochromatic CCD sensor and eliminates noise components by comparing color output signals and monochromatic output signals.

However, the above-mentioned conventional image scanners are not intended to save circuits for processing output signals from sensors and achieve a low cost of an image scanner in an image scanner equipped with color CCD sensors and a monochromatic CCD sensor.

On the other hand, in a four-line CCD sensor equipped with color CCD sensors and a monochromatic CCD sensor, in order to reduce a cost, a scanner is developed to use the same output signal processor commonly by switching color CCD sensors and a monochromatic CCD sensor by a switch. However, this scanner using the output signal processor commonly always sets a gain for amplifiers of the output signal processors by detecting the peak value of sensitivity of the color CCD sensors in spite of the color CCD sensors and the monochromatic CCD sensor equipped.

That is, in this image scanner commonly using the output signal processor, the amplifiers of the output signal processor are amplified according to the sensitivity of the color CCD sensors even when scanning monochromatic images by the monochromatic CCD sensor and signals scanned by the monochromatic CCD sensor are processed. Therefore, such defects are actually generated in the monochromatic image scanning performance as, for example, a gain of the amplifier and sensitivity of the monochromatic CCD sensor become different, color shading is produced on scanned images, dark areas of the images tend to lose detail and white wash out, etc.

Accordingly, in an image scanner using a four-line CCD sensor provided with color and monochromatic CCD sensors, it is demanded to realize a high grade image scanning of both color and monochromatic images without impairing the achievement of a low cost by setting gains of amplifiers faithfully to the respective color and monochromatic CCD sensors.

SUMMARY OF THE INVENTION

It is an object of the present invention to make the peak detection faithful to sensitivities of plural image sensors. It is another object to make a high grade image scanning of color and monochromatic images in an image scanner equipped with plural color and monochromatic image sensors by amplifying output signals from color image sensors or a monochromatic image sensor faithfully to sensitivities of respective image sensors.

According to preferred embodiments of the present invention, an image scanner is provided. This image scanner comprises: plural image sensors to output electric signals by detecting optical image data by applying the light from a light source; amplifiers to amplify outputs from the plural image sensors; and a peak detection processor to detect a peak value of sensitivity of at least one image sensor out of plural image sensors and set up a gain of the amplifier for each of the plural image sensor using the detected peak value.

Further, according to the embodiments of the present invention, in a peak detection processing method of an image scanner to scan images by amplifying electric signals converted from input optical image data in plural image sensors, a gain value of the amplifier is set for each of the plural image sensors using a peak value of sensitivity detected from the electric signals that is converted by at least one of the plural image sensors.

DETAILED DESCRIPTION OF THE EMBODIMENTS

Figure 1:
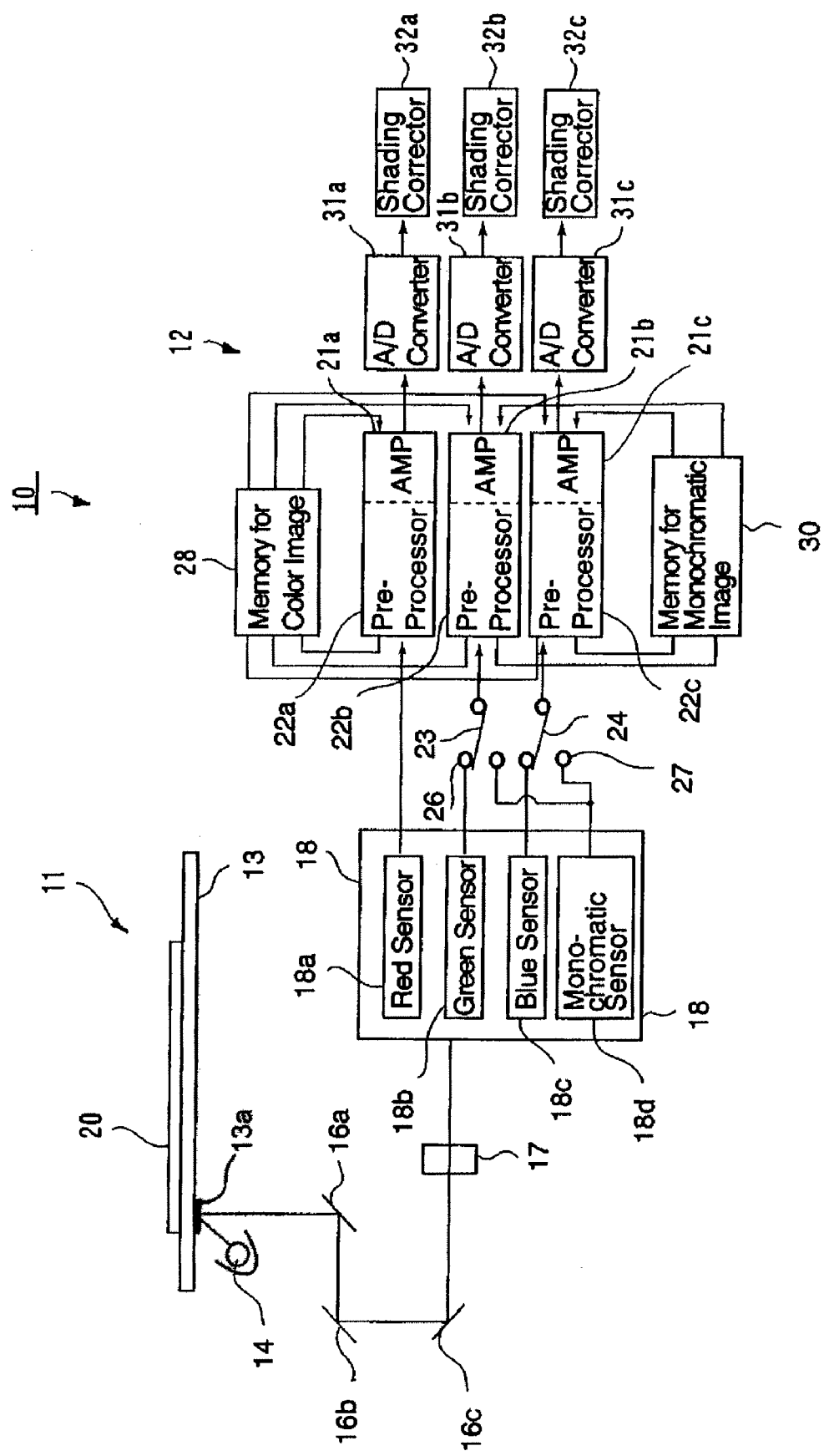
FIG. 1 is a schematic construction diagram showing an image scanner in a first embodiment of the present invention.
Figure 2:
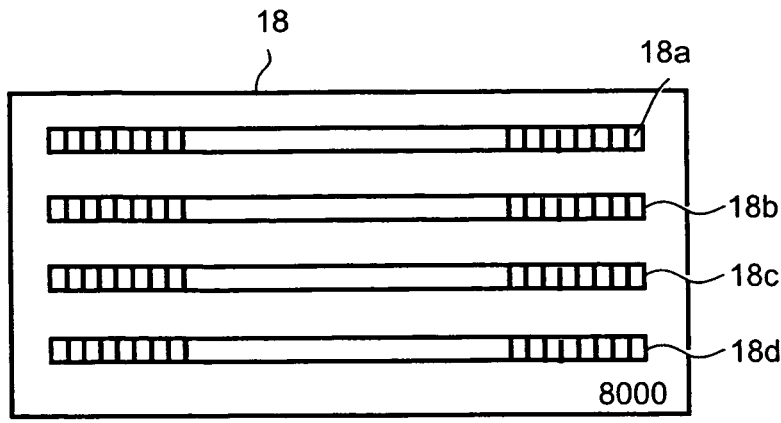
FIG. 2 is a schematic construction diagram showing a 4-line CCD sensor in the first embodiment of the present invention.

Preferred embodiments of the present invention will be described below in detail referring to attached drawings. FIG. 1 is a schematic diagram showing an optical system unit 11 and an output signal processor 12 of an image scanner 10 in a first embodiment of the present invention. The optical system unit 11 applies a light to a document 20 on a document table 13 and detects a reflected light from the document 20. This unit comprises: a xenon lamp 14 that is a light source, first through third mirrors 16a, 16b, 16c, a condenser 17 and a 4-line CCD sensor 18 that is an image sensor.

The 4-line CCD sensor 18 is composed of 4 lines of 3 line color CCD sensors of R (Red), G (Green), B (Blue) 18a, 18b, 18c and a monochromatic CCD sensor 18d. For example, the size per pixel of each line 18a-18d is 8×8 μm, the number of pixels per line is 800 pixels and a line space is 32 μm. The monochromatic CCD sensor 18d outputs pixels by dividing in ODD pixel/EVEN pixel and therefore, it is able to scan images at a two times speed of the color CCD sensors 18a-18c.

The output signal processor 12 is provided with first to third pre-processors 22a, 22b, 22c having first to third amplifiers 21a, 21b, 21c, first to third A/D converters 31a, 31b, 31c, first to third shading correction circuits 32a, 32b, 32c, a color memory 28 and a monochromatic memory 30. The peak detection processor is composed of the first to third pre-processors 22a, 22b, 22c, the color memory 28 and the monochromatic memory 30.

Photoelectric transferred output signals in the CCD sensors 18a-18d are input into the pre-processors 22a-22c. The pre-processors 22a-22c detect output signals from the CCD sensors 18a-18d into which the reflected light is input from a white reference 13a formed on and performs the peak detection of sensitivity of the CCD sensors 18a-18d. Further, the pre-processor 22a-22c set gains for the amplifiers 21a-21c according to gain values that are set using the detected peak values.

The CCD sensor 18 is composed of 4 lines. The pre-processors 22a-22c are provided with 3 amplifiers 21a-21c for 3-line color CCD sensors 18a-18c. The CCD sensor 18 and the pre-processors 22a-22c are connected via the first and the second switches 23 and 24.

The first switch 23 switches the ODD terminal 26 of the (green) color CCD sensor 18b and the monochromatic CCD sensor 18d. The second switch 24 switches the EVEN terminal 27 of the B (Blue) color CCD sensor 18c and the monochromatic CCD sensor 18d. The pre-processors 22a-22c are commonly used by switching the first and the second switches 23 and 24 when detecting color optical image data and monochromatic optical image data.

The memory for color image 28 stores gain values of the amplifiers 21a-21c that are set according to values of sensitivity detected for every color CCD sensors 18a-18c. The memory for monochromatic image 30 stores gain values of the second and third amplifiers 21b and 21c that are set according to a detected peak value of the monochromatic CCD sensor 18d. In the scanning of images, the amplifiers 21a-21c are amplified using the gain values stored in the memories for color or monochromatic image 28 or 30. The image carrier 10 detects the peak value of sensitivity of the CCD sensor 18 and executes the peak detection process for setting gain values of the amplifiers 21a-21c from the detected result and then, starts the scanning of the document 20.

Figure 3:
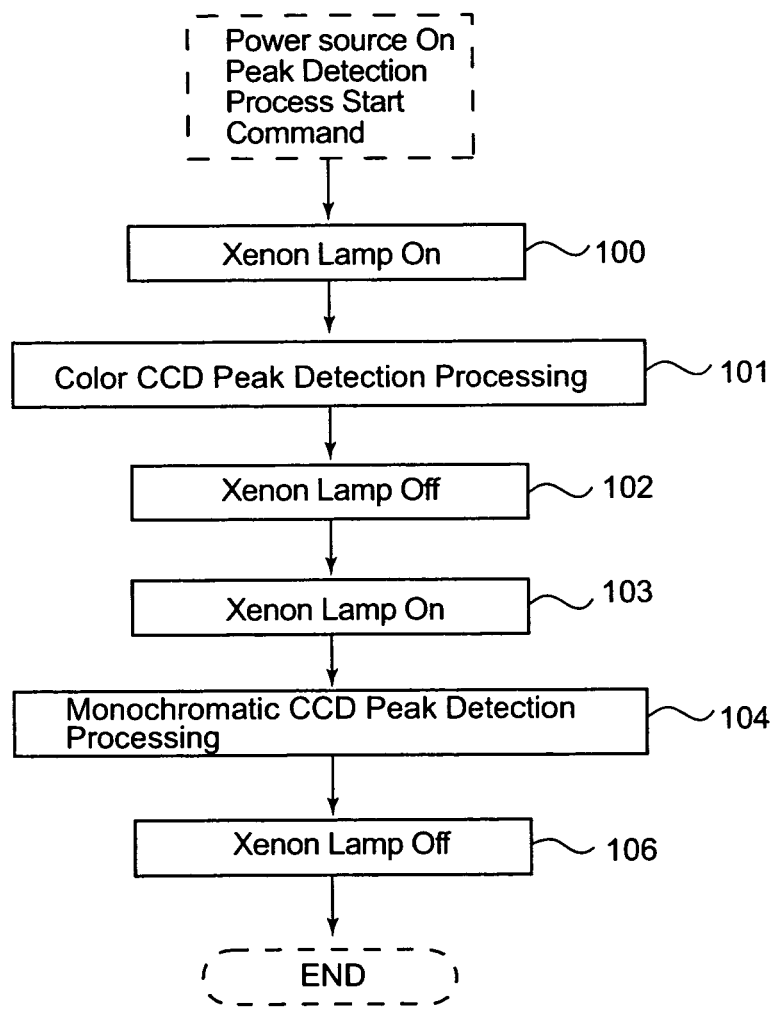
FIG. 3 is a flowchart showing the peak detection processing operation in the first embodiment of the present invention.

Next, the peak detection processing operation will be described referring to the flowchart shown in FIG. 3. When the power source is turned ON, a peak detection process start command for the start of the initializing operation is given and the xenon lamp 14 is turned ON in Step 100. Then, the color CCD peak detection process is executed in Step 101. At this time, the first and second switches 23 and 24 are connected to the G (Green) color CCD sensor 18b and B (Blue) color CCD sensor 18c, respectively.

When the R (Red), G (Green) and B (Blue) color CCD sensors 18a-18c detect the light of the xenon lamp 14 reflected from the white reference 13a in the color CCD peak detection process, the pre-processors 22a-22c detect peaks of sensitivity of the color CCD sensors 18a-18c. Further, the pre-processor 22a-22c set gain values of the amplifiers 21a-21c from the detected peak values and stores in the color memory 28.

Thereafter, the xenon lamp 14 is turn off in Step 102. Then, the xenon lamp 14 is again turned on in Step 103 and the monochromatic CCD peak detection process is executed in Step 104. At this time, the first and second switches 23 and 24 are connected to the ODD terminal 26 and the EVEN terminal 27 of the monochromatic CCD 18d, respectively. When the monochromatic CCD sensor 18d detects the light of the xenon lamp 14 reflected from the white reference 13a, the second and third pre-processors 22b and 22c make the detection of sensitivity peaks of the ODD pixels and EVEN pixels of the monochromatic CCD sensor 18d in this monochromatic CCD peak detection processing.

Furthermore, the second and third pre-processors 22b and 22c set gain values of the second and third amplifiers 21b and 21c from the detected peak values and stores in the memory for monochromatic image 30. Thereafter, the xenon lam 14 is turned off in Step 106 and the peak detection processing operation is terminated. Hereafter, when other initializing operation is completed, the image carrier 10 becomes ready to make the scanning. Further, by exchanging Steps 101 and 104 of the flowchart shown in FIG. 3 and the monochromatic CCD peak detection processing may be first executed, the xenon lamp 14 is once turned off and again turned on and then, the color CCD peak detection processing may be executed.

Thereafter, when the image scanning is made and the document 20 is a color image, the first and second switches 23 and 24 are connected to the G (Green) and B (Blue) color CCD sensors 18b and 18c, respectively. Further, in the pre-processors 22a-22c, the gains of the amplifiers 21a-21c are set as gain values that are to be stored in the color memory 28. As a result, the amplifiers 21a-21c amplify output signals faithfully to the sensitivity of the color CCD sensors 18a-18c. When the pre-process setting of the color CCD sensors 18a-18c is completed, the optical unit 11 is operated and the scanning operation of the document 20 is executed by detecting the color optical image data reflected from the document 20 by the color CCD sensors 18a-18c.

Then, when the document 20 is a monochromatic image, the first and second switches 23 and 24 are switched to connect to the ODD terminal 26 and the EVEN terminal 27 of the monochromatic CCD sensor 18d, respectively. Further, in the second and third pre-processors 22b and 22c, the gains of the second and third amplifiers 21b and 21c are set as the gain values that are to be set in the monochromatic memory 30. As a result, the second and third amplifiers 21b and 21c amplify he output signals faithfully to the sensitivity of the monochromatic CCD sensor 18d. Thus, when the setting of the pre-processing of the monochromatic CCD sensor 18d is completed, the optical unit 11 is operated, the monochromatic optical image data reflected from the document 20 is detected and the scanning of the document 20 is executed.

According to this first embodiment, in an image scanner using the 4-line CCD sensor 18, it is possible to detect peaks of sensitivities of the color CCD sensors 18a-18c and peak of sensitivity of the monochromatic CCD sensor 18d and set gains of the amplifiers 21a-21c faithfully to the detected sensitivities of the color CCD sensors 18a-18c and the monochromatic CCD sensor 18d, respectively. Therefore, from a color or monochromatic document, the high-grade image scanning faithful to the document can be made. Further, according to the first embodiment, despite of being a 4-line CCD sensor, a cost of this image is reduced as the number of circuits are saved by commonly using the output signal processor 12 by the color CCD sensors 18a-18c and the monochromatic CCD sensor 18d by switching the first and second switches 23 and 24. Furthermore, according to this first embodiment, as the xenon lamp 14 is once turned off after detecting peaks of sensitivities of the color CCD sensors 18a-18c and then, is again turned on and peak of sensitivity of the monochromatic CCD sensor 18d is detected, peak sensitivities of the color CCD sensors 18a-18c and the monochromatic CCD sensor 18d are detected at the same start-up timing as the xenon lamp 14 and it becomes possible to detect peak sensitivities more precisely.

Figure 4:
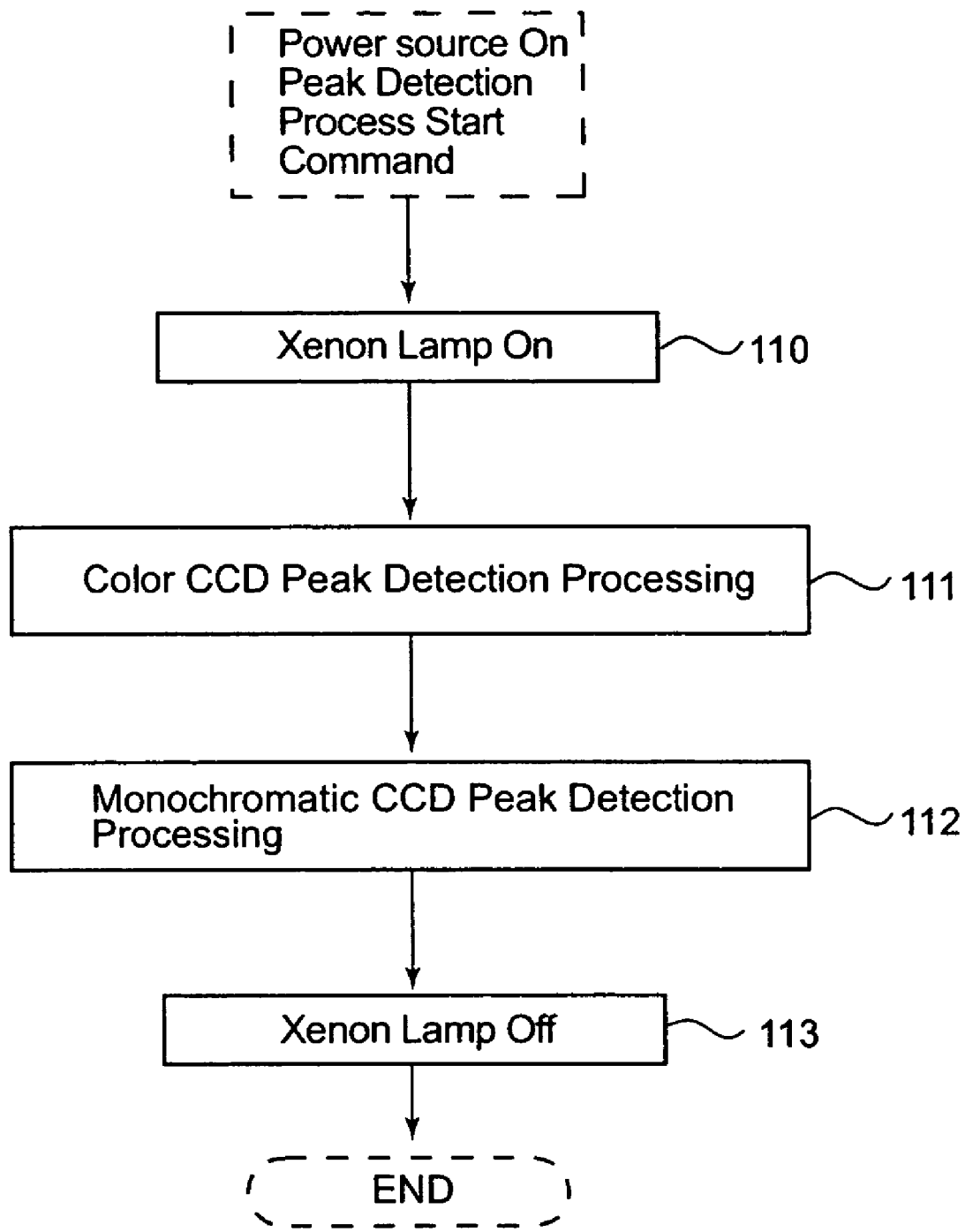
FIG. 4 is a flowchart showing the peak detection processing operation in a second embodiment of the present invention.

Next, a second embodiment of this invention will be described. This second embodiment differs from the first embodiment in the timing of the peak detection processing of the color CCD sensors 18a-18c and the monochromatic CCD sensor 18d. Accordingly, in this second embodiment, the same component elements as those explained in the first embodiment will be assigned with the same reference numerals and the detailed explanation thereof will be omitted. In this second embodiment, the same image scanner 10 as the first embodiment is used. FIG. 4 shows a flowchart of the peak detection processing operation.

When the power source is turned on and the initializing operation starts, a peak detection process starting command is given and the xenon lamp 14 is turned on in Step 110. Then, the color CCD peak detection processing is executed in Step 111 in the same manner as in Step 101. Then, the monochromatic CCD peak detection processing is executed in Step 112 in the same manner as in Step 104. Thereafter, the xenon lamp 14 is turned off in Step 113 and the peak detection processing is completed. Thereafter, when other initializing operations are completed, the image scanner 10 becomes ready to make the scanning. Further, Step 111 and Step 112 of the flowchart shown in FIG. 4 may be exchanged, and the monochromatic CCD peak detection processing can be first executed and then, the color CCD peak detection processing may be executed. After completing this initializing operation, the scanning of the color or monochromatic document 20 is started. At the time to start this scanning, the amplifiers 21a-21c are set at gains faithful to sensitivities of the color CCD sensor 18a-18c or the monochromatic CCD sensor 18d obtained by the peak detection processing operation.

According to this second embodiment, on an image scanner using the 4-line CCD sensor 18, the amplifiers 21a-21c can be set at gains faithful to sensitivities of the color CCD when scanning the document 20 and images are scanned faithfully from either color or monochromatic documents. Further, according to this second embodiment, the output signal processor 12 can be used commonly by the color CCD sensors 18a-18c and the monochromatic CCD sensor 18d likewise the first embodiment and the cost reduction can be achieve by the saving of circuits.

Figure 5:
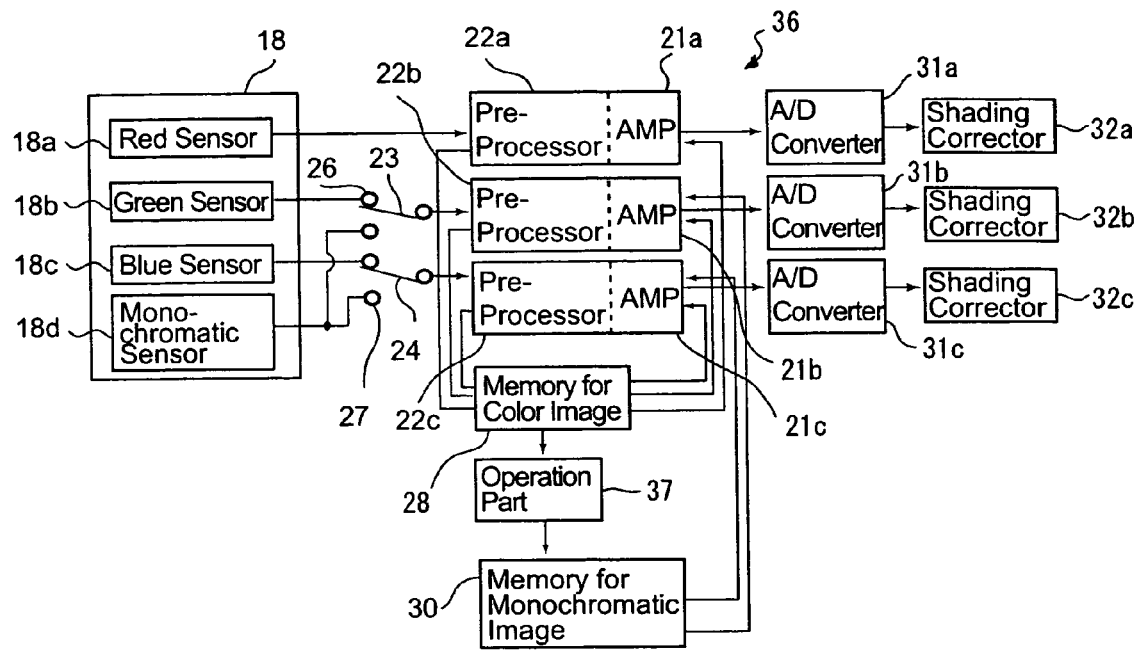
FIG. 5 is a schematic construction diagram showing the output signal processor in a third embodiment of the present invention.

Next, a third embodiment of this invention will be described. In this third embodiment, a gain value of the monochromatic CCD sensor 18d is calculated using the peak value obtained by the peak detection processing of the color CCD sensors 18a-18c in the first embodiment are used as a common peak value. Accordingly, in this third embodiment, the same component elements as explained in the first embodiment will be assigned with the same reference numerals and the detailed explanation thereof will be omitted. FIG. 5 is a schematic construction diagram showing an output signal processor 36 of the CCD sensor 18 in the third embodiment. In this embodiment, the sensitivities of the color CCD sensors 18a-18c differ from the sensitivity of the monochromatic CCD sensor 18d but a sensitivity ratio of the monochromatic CCD sensor 18d to the color CCD sensors 18a-18c is pre-cleared.

The output signal processor 36 has an operation part 37 for computing gain values of the second and third amplifiers 21b and 21c for monochromatic images. This operation part 37 computes gain values of the second and third amplifiers 21b and 21c by multiplying the gain values of the second and third color image amplifiers 21b and 21c that are set from the peak values of sensitivity of the G (Green) and B (Blue) color CCD sensors 18b and 18c by an already known sensitivity ratio of the monochromatic CCD sensor 18d. The memory for monochromatic image 30 stores the gain values of the second and third amplifiers 21b and 21c computed in the operation part 37.

Figure 6:
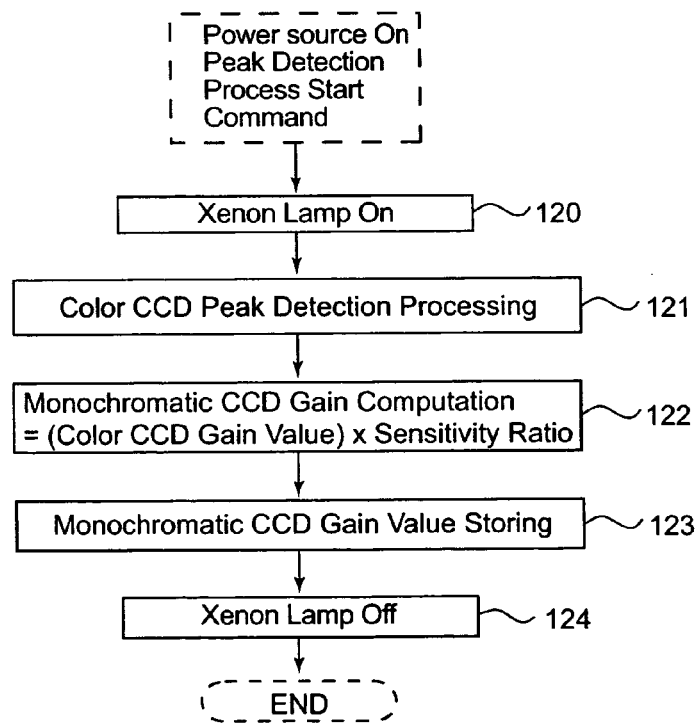
FIG. 6 is a flowchart showing the peak detection processing operation in the third embodiment of the present invention.

Next, the peak detection processing operation will be described referring to the flowchart shown in FIG. 6. When the power source is turned on and the initializing operation starts, the peak detection process stating command is given and the xenon lamp 14 is turned on in Step 120. Then, the color CCD peak detection processing is executed in Step 121 in the similar manner in Step 101, and gain values of the amplifiers 21a-21c that are set from the common peak value for every color CCD sensors 18a-18c are stored in the memory for color images 28.

Then, proceeding to Step 122, a gain value for the monochromatic CCD sensor 18d of the second and the third amplifiers 21b and 21c is computed in the operation part 37 by multiplying the gain values of the second and third amplifiers 21b and 21c of the color CCD sensors 18a-19c by a pre-cleared sensitivity ratio of the monochromatic CCD sensor 18d. Thereafter, the gain value for the monochromatic CCD sensor 18d computed in the operation part 37 is stored in the monochromatic memory 30 in Step 123, the xenon lamp 14 is turned off in Step 124 and the peak detection processing operation is completed. Further, when the monochromatic peak detection process is executed in Steps 121 and 122 of the flowchart shown in FIG. 6 and a common peak value is obtained, a gain value for color images may be computed by multiplying a monochromatic gain value that is set using the common peak value by a sensitivity ratio.

After completing the initializing operation, the scanning operation of the color or monochromatic document 20 starts. In this scanning operation, the gain values of the amplifiers 21a-21c are set at gain values faithful to sensitivity of the color CCD sensors 18a-18c or the monochromatic CCD sensor 18d obtained by the peak detection processing operation and the scanning operation of the document 20 is executed.

According to this third embodiment, likewise the first embodiment, when scanning a document 20 by an image scanner using the 4-line CCD sensor 18, it is possible to set gains of the amplifiers 21a-21c faithful to sensitivities of the color CCD sensors 18a-18c and the monochromatic CCD sensor 18d, and images faithful to either color or monochromatic documents can be scanned. Further, according to this third embodiment, only when detecting peak values of the color CCD sensors 18a-18c, a gain value of the monochromatic CCD sensor 18d can be computed and it is therefore not necessary to detect the peak of the monochromatic CCD sensor 18d and as the peak detection time is reduced, it is enabled to perform the image scanning at a high-speed. Further, according to this third embodiment, likewise the first embodiment, the same output signal processor 12 can be used commonly by the color CCD sensors 18*a*-18*c* and the monochromatic CCD sensor 18*d* and a cost can be reduced as a result of the saving of circuits.

Figure 7:
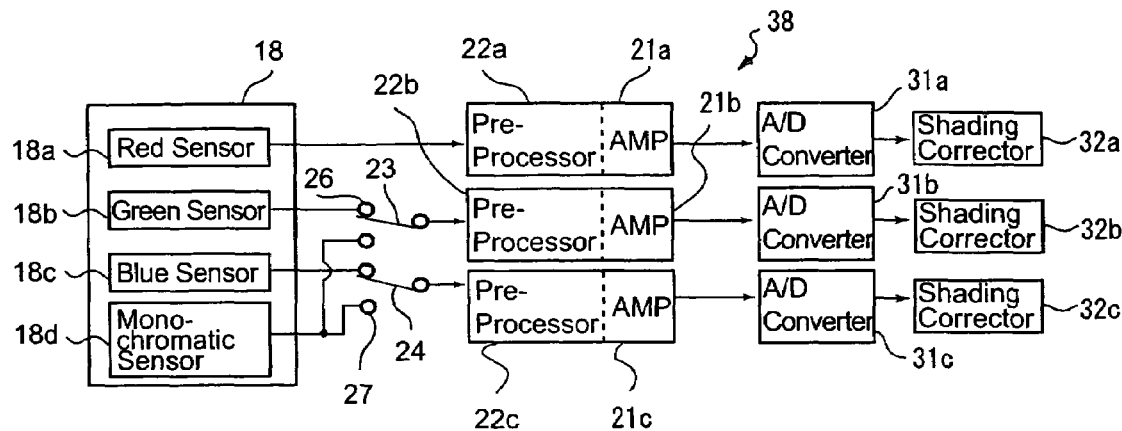
FIG. 7 is a schematic construction diagram showing the output signal processor in a fourth embodiment of the present invention.

Next, a fourth embodiment of the present invention will be described. In this fourth embodiment, using the peak value obtained from the peak detection processing of the color CCD sensors 18*a*-18*c* in the first embodiment, a gain value of the color CCD sensors 18*a*-18*c* is set and this gain value is substituted as a gain value for the monochromatic CCD sensor 18*d*. Accordingly, in this fourth embodiment, the same component elements are assigned with the same reference numerals and the detailed explanation there of will be omitted. FIG. 7 is a schematic construction diagram showing an output signal processor 38 of the CCD sensor 18. In this embodiment, the color CCD sensors 18*a*-18*c* and the monochromatic CCD sensor 18*d* are set at the same level of sensitivity.

Figure 8:
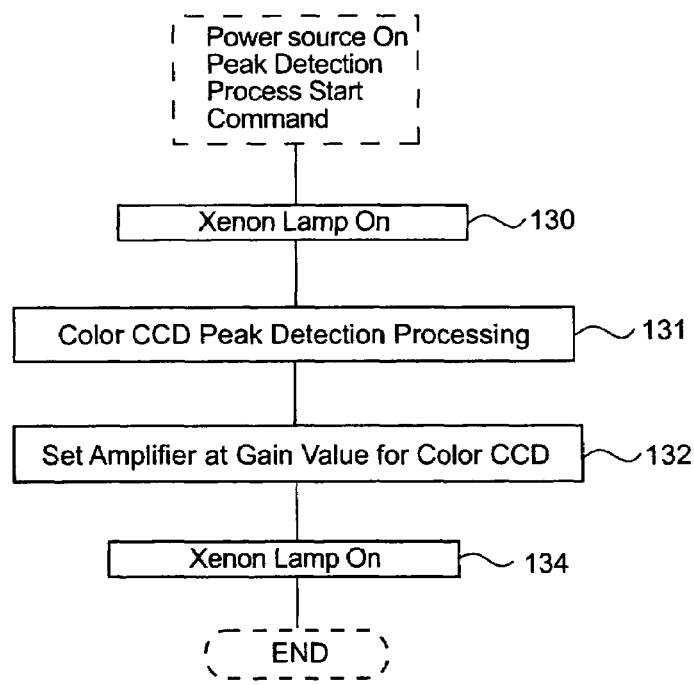
FIG. 8 is a flowchart showing the peak detection processing operation in the fourth embodiment of the present invention.

Next, the peak detection processing will be described referring to the flowchart shown in FIG. 8. When the power source is turned on and the initializing operation starts, the peak detection processing start command is given, and xenon lamp 14 is turned on in Step 130. Then, the color CCD peak detection processing is executed in Step 131 in the same manner as in Step 101 and gain values for the amplifiers 21*a*-21*c* using the peak values that are common peak values for the color CCD sensors 18*a*-18*c*. Then, in Step 132, the amplification factors for the amplifiers 21*a*-21*c* are set at the gain values obtained in the color CCD peak detection processing. Thereafter, the xenon lamp 14 is turned off in Step 124 and the peak detection processing operation is terminated.

As the sensitivities of the color CCD sensors 18*a*-18*c* are the same as the sensitivity of the monochromatic CCD sensor 18*d*, in the subsequent image scanning, a color or monochromatic document 20 is scanned at the gain value for the amplifiers 21*a*-21*c* in the as-is state when set at the gain values obtained by the color CCD peak detection processing.

According to the fourth embodiment, only by detecting the peak of sensitivity for the color CCD sensors 18*a*-18*c*, the gain value for the color CCD sensors 18*a*-18*c* can be substituted in the as-is state as a gain value for the monochromatic CCD sensor 18*d* and therefore, it is not necessary to make the peak detection of the monochromatic CCD sensor 18*d* and a high-speed image scanning can be achieved as a peak detection time is shortened. In addition, according to this fourth embodiment, likewise the first embodiment, a cost can be reduced when the output signal processor 12 is used commonly by the color CCD sensors 18*a*-18*c* and the monochromatic CCD sensor 18*d* and furthermore, as a memory to store gain values and an arithmetic circuit for computing gain values are not required, the cost reduction can be achieved.

Further, the present invention is not limited to the above-mentioned embodiments but can be changed or modified variously without departing from the scope thereof. For example, the light source of an image scanner can be a halogen lamp and the like when the light from a document can be input into image sensors, and when image sensors are line sensors, size of one pixel, the number of pixels, etc. are not restricted. Further, for example, in the first embodiment, an output signal from a monochromatic CCD sensor can be divided into three portions and the first through the third amplifiers may be used. It is thus possible to increase the scanning speed of a monochromatic image as high as three times of color image scanning speed.

As described above in detail, according to the present invention, it is possible to set gains for the amplifiers faithful to sensitivities of image sensors using peak values obtained by the peak detection faithful to sensitivities of plural image sensors. Or, according to the present invention, using a peak value of sensitivity of any image sensor out of plural image sensors as a common peak value, and output signals from plural image sensors can be amplified faithful to respective sensitivities. Accordingly, in an image scanner equipped with plural color and monochromatic image sensors, output signals from color image and monochromatic image sensors can be amplified faithful to respective sensitivities, the high grade color and monochromatic image scanning can be made. Further, according to the present invention, as the number of circuits are saved by using the same amplifier commonly by plural image sensors and thus, a manufacturing cost of an image scanner can be reduced.

What is claimed is:

1. An image scanner, comprising:

plural image sensors including color image sensors to detect optical color image data and a monochromatic image sensor to detect optical monochromatic image data by applying light from a light source to a document and output electric signals;

amplifiers to amplify the outputs of plural image sensors; and a peak detection processing portion to set gain values of the amplifiers for the plural image sensors by detecting a peak value of sensitivity of each of the plural image sensors, wherein the output signals from the color image sensors and the output signal from the monochromatic image sensor are switched between the color image sensors and the monochromatic image sensor and the amplifiers amplify the output signals of the color image sensors when the color image sensors are switched from the monochromatic sensor and the amplifier amplifies the output signal of the monochromatic image sensor when the monochromatic image sensor is switched from the color image sensors.

2. The image scanner according to claim 1, wherein the plural image sensors are line sensors.

3. The image scanner according to claim 1, wherein the light source is turned on/off whenever peak values of sensitivity of the plural image sensors are detected.

4. A peak detection processing method of an image scanner to scan images, comprising:

converting optical color image data into electric signals with color image sensors and converting optical monochromatic image data into an electric signal with an monochromatic image sensor;

amplifying the electric signals from the color image sensors and the monochromatic image sensor;

setting gain values for amplifying for each of the color image sensors using an optional peak value of sensitivity detected from the electric signals converted in at least one of the color image sensors and the monochromatic sensor;

setting a gain value for amplifying the monochromatic sensor, the gain value being obtained based on a sensitivity ratio of the monochromatic sensor and the gain values of the plural color image sensors; and amplifying the electric signals from the color image sensors and the monochromatic image sensor by switching the electric signals from the color image sensors and monochromatic image sensor.

5. The peak detection processing method of an image scanner according to claim 4, wherein the color image sensors and the monochromatic image senor are line sensors.

6. The peak detection processing method of an image scanner according to claim 4, further comprising multiplying the gain values of the plural image sensors by the sensitivity ratio of the monochromatic sensor.

7. The peak detection processing method of an image scanner according to claim 4, further comprising storing the gain value for amplifying for the monochromatic sensor.

* * * * *